US010473236B2

United States Patent
Ziola et al.

(10) Patent No.: US 10,473,236 B2
(45) Date of Patent: *Nov. 12, 2019

(54) UNDERGROUND PIPE PULLING PROCESS AND PIPE PULL HEAD

(71) Applicant: Borehead, LLC, Bemidji, MN (US)

(72) Inventors: David A. Ziola, Ashland, NE (US); Aaron Faken, Minot, ND (US); Jason Lavalley, Bemidji, MN (US); Jesse Kilde, Blackduck, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/922,487

(22) Filed: Mar. 15, 2018

(65) Prior Publication Data

US 2018/0202578 A1 Jul. 19, 2018

Related U.S. Application Data

(63) Continuation of application No. 15/493,493, filed on Apr. 21, 2017, now Pat. No. 9,951,885, which is a continuation of application No. 15/010,194, filed on Jan. 29, 2016, now Pat. No. 9,719,611.

(51) Int. Cl.
| | |
|---|---|
| *F16L 1/032* | (2006.01) |
| *F16L 55/30* | (2006.01) |
| *F16L 1/00* | (2006.01) |
| *F16L 101/50* | (2006.01) |
| *F16L 3/10* | (2006.01) |
| *F16L 55/115* | (2006.01) |

(52) U.S. Cl.
CPC ............... *F16L 1/00* (2013.01); *F16L 1/032* (2013.01); *F16L 3/1066* (2013.01); *F16L 3/1091* (2013.01); *F16L 55/1152* (2013.01); *F16L 55/30* (2013.01); *F16L 2101/50* (2013.01)

(58) Field of Classification Search
CPC . F16L 1/028; F16L 1/032; F16L 1/036; F16L 1/06; F16L 55/18; F16L 55/30; F16L 2101/50
USPC .................. 405/184, 184.1, 184.2, 184.3
See application file for complete search history.

(56) References Cited

U.S. PATENT DOCUMENTS

| | | | |
|---|---|---|---|
| 4,006,521 A | 2/1977 | Pedone | |
| 4,080,799 A * | 3/1978 | Nanny | F16L 1/26 138/93 |
| 4,318,639 A | 3/1982 | Schosek | |
| 4,453,603 A | 6/1984 | Voss et al. | |
| 4,507,019 A | 3/1985 | Thompson | |
| 4,563,032 A | 1/1986 | Knowles | |
| 4,634,313 A | 1/1987 | Robbins | |
| 4,637,756 A | 1/1987 | Boles | |

(Continued)

OTHER PUBLICATIONS

Freudenberg Oil & Gas Technologies, "Vector Slimlok Clamps", 2014.*

(Continued)

*Primary Examiner* — Frederick L Lagman
(74) *Attorney, Agent, or Firm* — Suiter Swantz PC LLO

(57) ABSTRACT

A pipe pulling technique where an adaptor is attached to the end of the pipe prior to the pipe being pulled underground, for example through a drilled hole. Attaching the adaptor to the pipe end prior to the pipe being pulled underground is faster and reduces danger to workers compared to the conventional process of attaching the adaptor to the end of the pipe after the pipe has been pulled underground.

18 Claims, 12 Drawing Sheets

(56) References Cited

U.S. PATENT DOCUMENTS

| | | | |
|---|---|---|---|
| 4,719,687 A * | 1/1988 | Nanny | F16L 1/26 138/89 |
| 4,969,677 A | 11/1990 | Melegari | |
| 5,173,009 A | 12/1992 | Moriarty | |
| 5,439,320 A * | 8/1995 | Abrams | E21B 7/30 405/184 |
| 5,642,912 A | 7/1997 | Parish, II | |
| 5,651,639 A | 7/1997 | Wentworth et al. | |
| 5,967,698 A * | 10/1999 | Pascoe | B29C 65/7802 405/154.1 |
| 6,109,832 A | 8/2000 | Lincoln | |
| 6,148,864 A | 11/2000 | Pascoe | |
| 6,499,912 B2 | 12/2002 | Coon | |
| 6,644,887 B2 | 11/2003 | Hesse | |
| 6,682,264 B1 | 1/2004 | McGillis | |
| 7,086,808 B2 | 8/2006 | Wentworth et al. | |
| 7,270,500 B1 | 9/2007 | Ammons et al. | |
| 7,985,037 B2 | 7/2011 | Duggan | |
| 9,719,611 B1 | 8/2017 | Ziola et al. | |
| 9,951,885 B2 * | 4/2018 | Ziola | F16L 1/00 |
| 2002/0081154 A1 | 6/2002 | Herrick et al. | |
| 2003/0165360 A1 | 9/2003 | Wentworth et al. | |
| 2005/0201834 A1 | 9/2005 | Lafontaine | |
| 2007/0053749 A1 | 3/2007 | Jarvis et al. | |
| 2007/0212169 A1 | 9/2007 | Crane | |
| 2008/0286051 A1 | 11/2008 | Duggan | |
| 2015/0053295 A1 | 2/2015 | Elzink | |
| 2015/0233183 A1 | 8/2015 | Melsheimer | |
| 2018/0058607 A1 * | 3/2018 | Baumgartner | F16L 1/032 |

OTHER PUBLICATIONS

Tekflow, Special Solutions, Figure 3 Pulling head, Jul. 2, 2013.*
"Ductile Iron Mechanical Joint Anchor Fittings, MJ Adapter Design Information"; Georg Fischer Central Plastics; Dec. 28, 2015; 9 pages.
International Search Report and Written Opinion of international application No. PCT/US2017/014868, dated Apr. 17, 2017, total 13 pages.
www.tekflow.fr/special-solutions/, Tekflow.fr. Jul. 2, 2013; Internet Archive https://web.archive.org/web/20130702035748/http://www.tekflow.fr/special-solutions/; Oct. 23, 2017, 2 pages.
Complaint filed in Case 0:17-cv-05369 (Borehead, LLC vs Ellingson Drainage, Inc., d/b/a Ellingson Companies, and Quickconnect LLC), United States District Court for the District of Minnesota, Filed Nov. 29, 2017 (pp. 59).

* cited by examiner

UNDERGROUND PIPE PULLING PROCESS AND PIPE PULL HEAD

FIELD

This description relates to pulling pipe underground beneath an obstacle from a first side to a second side of the obstacle.

BACKGROUND

It is known to pull a pipe through a borehole drilled in the earth beneath an obstacle from a first side to a second side of the obstacle. This process can be used to run the pipe underneath the obstacle, such as a river, a roadway, or the like, from one side to the other.

In the conventional process, a pull head is attached to the pipe at the first side. The pipe is then pulled underground through the borehole from the first side to the second side. At the second side, the pull head is removed from the pipe, a section of pipe is then cut from the pipe end, and a pipe adaptor is then fused to the end of the pipe. The end of a new section of pipe is then joined to the pipe adaptor to continue the pipeline.

The fusing or welding of the pipe adaptor to the end of the pipe at the second side typically occurs within a trench or bell hole that is dug at the second side. The trench accommodates the fusing or welding equipment, the pipe cutting equipment, the pipe pulling equipment and other equipment, as well as personnel operating the equipment. The trench or bell hole is typically deep, for example 6 to 8 feet deep. Therefore, the sides of the trench or bell hole need to be reinforced to prevent collapse of the trench onto personnel working in the trench. In addition, the trench can be muddy which increases the danger to personnel working in the trench. Therefore, the process of fusing or welding the pipe adaptor to the end of the pipe at the second side within the trench can be a lengthy process and it can be dangerous to personnel.

SUMMARY

A pipe pulling technique is described where the adaptor is attached to the end of the pipe at the first side prior to the pipe being pulled underground, for example through a pre-drilled hole. The attachment of the adaptor to the pipe at the first side occurs above ground, e.g. not within a trench. As a result, attaching the adaptor to the pipe end at the first side while the pipe end is above ground, and prior to pulling the pipe underground, is faster and reduces danger to workers compared to the conventional process of attaching the adaptor at the second side within a trench.

In one embodiment, the pipe and adaptor are both made of plastic, and the adaptor is attached to the pipe end by fusing the end of the adaptor to the end of the pipe. However, the pipe and the adaptor can be made of any materials, including but not limited to metal, that are suitable to permit attaching the adaptor and the pipe together in any manner that satisfies the intended application(s) of the pipe.

In one embodiment, the pipe can be part of a pipeline that is intended to carry liquids and/or gases. In another embodiment, the pipe can be part of pipeline through which cables, for example electrical and/or fiber optic cables, can be run.

The adaptor can be configured to connect to an end of any pipeline component at the second side that is intended to be part of the pipeline. In one embodiment, the adaptor can be a plastic pipe adaptor that is configured to connect to an end of a second plastic pipe at the second side. However, the pipeline component can be a section of pipe, a valve, a coupler that splits flow through the first pipe into multiple flow paths or that gathers flow from multiple flow paths into a single path for flow through the first pipe, and other components used in pipelines.

In one embodiment, a method of pulling a pipe underground from a first side to a second side includes at the first side, attaching an adaptor to an end of the pipe, the adaptor being configured to connect to a pipeline component at the second side. At the first side, attaching a pull head to the adaptor. The pipe is then pulled underground from the first side to the second side by applying a pulling force to the pull head from the second side. At the second side, the pull head is removed, and the pipeline component is connected to the adaptor.

As used herein, the term "first side" refers to the side at which the end of the pipe is first pulled underground, while the "second side" refers to the side at which the end of the pipe exits after the pipe is pulled underground from the first side. From the perspective of the drilling equipment used to drill the hole through which the pipe is pulled, the first side may be considered an "exit side" as it is the side through which the drill exits after drilling the hole, while the second side may be considered an "entrance side" as it is the side through which the drill initially enters the earth for drilling the hole. Alternatively, from the perspective of the pipe to be pulled underground, the first side may also be considered an "entrance side" as it is the side through which the end of the pipe being pulled initially enters the hole through which the pipe is being pulled, while the second side may also be considered an "exit side" as it is the side through which the end of the pipe exits the hole after being pulled underground.

In another embodiment, a method of pulling a pipe underground from a first side to a second side includes at the first side, fusing or welding a first end of a pipe adaptor to an end of the pipe, a second end of the pipe adaptor being configured to connect to a pipeline component at the second side. In addition, at the first side, a pull head is attached to the pipe adaptor after the pipe adaptor is fused to the end of the pipe. Thereafter, the pipe is pulled underground from the first side to the second side by applying a pulling force to the pull head from the second side. At the second side, the pull head is removed, and the pipeline component is connected to the end of the pipe adaptor after removing the pull head.

In still another embodiment, a pull head is provided that is used to pull a pipe underground from a first side to a second side. The pull head includes a pull head collar formed by at least first and second shell pieces that are detachably connectable to one another, where the at least first and second shell pieces are sized to surround an end of the pipe when the at least first and second shell pieces are connected together. Each of the at least first and second shell pieces includes an interior surface and a channel is formed on the interior surface of each of the at least first and second shell pieces, wherein when the at least first and second shell pieces are connected together the channels of the at least first and second shell pieces align with one another to form a substantially continuous circumferential channel that in use receives a flange on the pipe. In addition, a pull head cap is connected to first ends of the at least first and second shell pieces when the at least first and second shell pieces are connected together, wherein in use the pull head cap connects to a pull line that applies a pulling force to the pull head.

DRAWINGS

DETAILED DESCRIPTION

Figure 1:
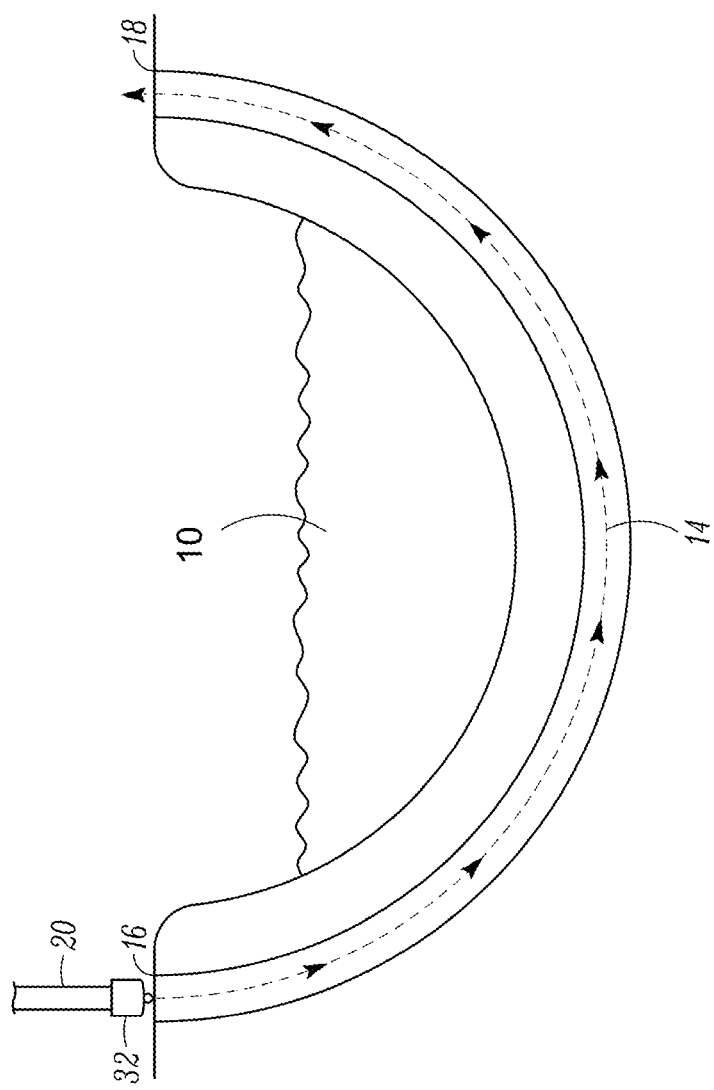
FIG. 1 illustrates an example application of the pipe pulling technique described herein.

FIG. 1 illustrates an example application of the pipe pulling technique described herein. In this example, a pipeline needs to be extended underneath an obstacle 10, such as, but not limited to, a river. The obstacle 10 could be a roadway, or any other obstacle under which one may wish to extend a pipeline. The pipeline can be intended to carry liquids and/or gases, or the pipeline can act as a conduit through which cables, for example electrical and/or fiber optic cables, can be run underneath the obstacle 10.

A hole 14 is initially drilled into the ground underneath the obstacle 10, with the hole 14 extending from a first side 16 on one side of the obstacle 10 to a second side 18 on the other side of the obstacle 10 using any suitable directional drilling technique. In one embodiment, the hole 14 is drilled by directional drill equipment the employs a drill that drills into the earth starting from the second side 18 and that exits the first side 16. Directional drilling is well known in the art. Thereafter, a pipe 20 that forms part of the pipeline is pulled underground through the hole 14 from the first side 16 to the second side 18 as indicated by the arrows in FIG. 1. As discussed in further detail below, prior to pulling the pipe 20, an adaptor 30 (seen in FIGS. 2-3 and 5) is attached to an end of the pipe 20 at the first side 16, and a pull head 32 is secured around the adaptor 30 at the first side 16. A pull line (not shown), such as a cable or rope or pipe, is affixed to the pull head 32 and applies a pulling force to the pull head 32 and the pipe 20 via a suitable pulling mechanism (not shown) located at or near the second side 18.

Figure 5:
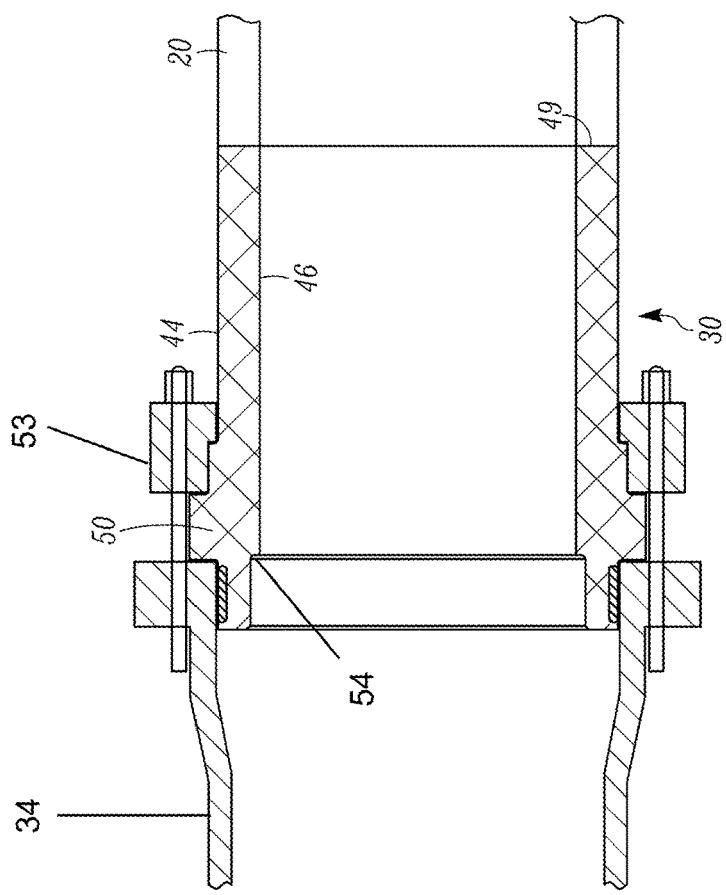
FIG. 5 illustrates an example of a pipe that is connected to the adaptor at the exit side.

The adaptor 30 will now be described with reference to FIGS. 2-5. In general, the adaptor 30 is configured to be attached to the pipe 20 at or near the first side 16 while the end of the pipe 20 is above ground and prior to the pipe 20 being pulled underground. The adaptor 30 is also configured to connect to a pipeline component at the exit side 18 that is intended to form part of the pipeline. For example, the pipeline component can be another section of pipe, a valve, a coupler that splits flow through the pipe 20 into multiple flow paths or that gathers flow from multiple flow paths into a single path for flow through the pipe 20, and other pipeline components used in pipelines. FIG. 5 illustrates the pipe 20 and the adaptor 30 after being pulled to the second side 18 and connected to a pipeline component 34 in the form of another section of pipe.

The adaptor 30 and the pipe 20 can be attached to one another in any manner so that the adaptor 30 and the pipe 20 are attached together substantially permanently and a liquid-tight joint is formed therebetween. For example, the adaptor 30 and the pipe 20 can each be made of plastic and the adaptor 30 and the pipe 20 can be fused, i.e. "welded", to one another whereby a molecular bond creating a liquid-tight joint is formed between the adaptor 30 and the pipe 20. Fusing of a plastic adaptor to a plastic pipe is well known in the art. If the adaptor 30 and the pipe 20 are made of metal, the adaptor 30 and the pipe 20 could be welded together using conventional metal welding techniques.

Figure 2:
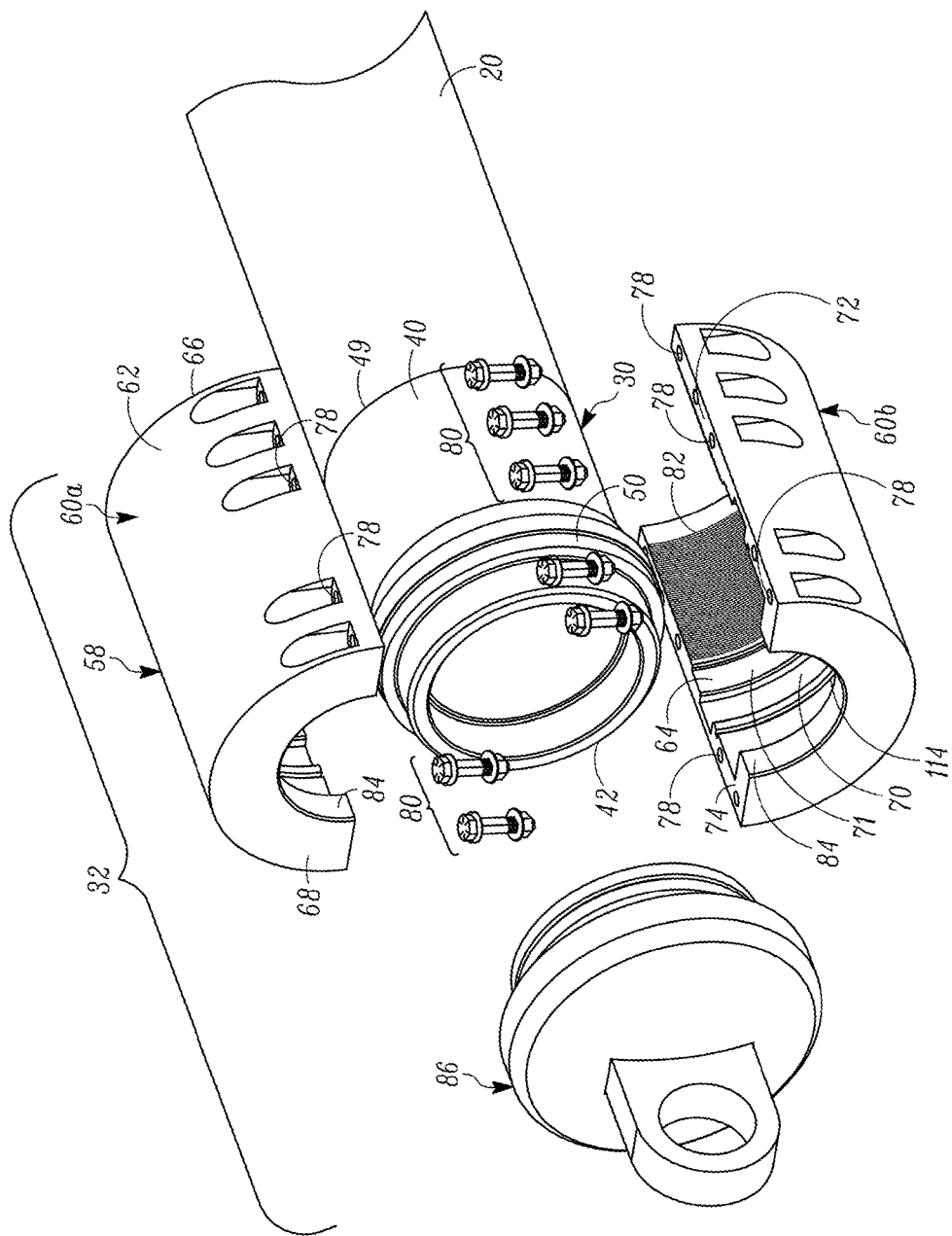
FIG. 2 is an exploded perspective view of the adaptor attached to the end of the pipe and the parts of the pull head.
Figure 3:
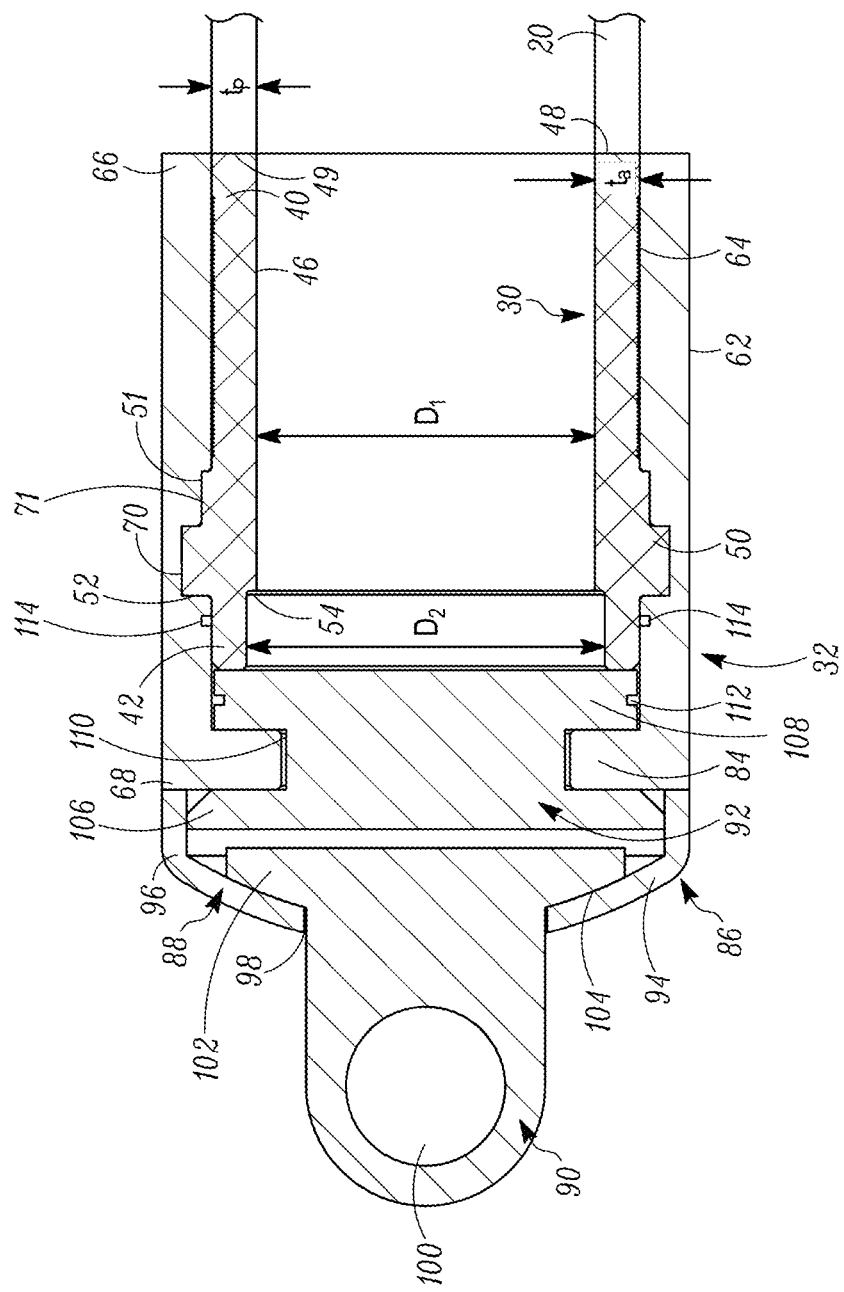
FIG. 3 is a cross-sectional side view of the adaptor attached to the end of the pipe and the pull head mounted in place.

Referring to FIGS. 2 and 3, in one embodiment the adaptor 30 is a substantially cylindrical, tubular structure, and the pipe 20 is also substantially cylindrical. The adaptor 30 has a first end 40, a second end 42, an exterior surface 44 (best seen in FIG. 5), and an interior surface 46. The first end 40 is attached, for example fused, to an end 48 of the pipe 20 as shown in FIGS. 3 and 5 to form a liquid-tight joint 49 therebetween. In the illustrated example, a thickness $t_a$ of the adaptor 30 measured between the exterior surface 44 and the interior surface 46 at the first end 40 is substantially equal to the thickness $t_p$ of the pipe 20 at the end 48 so that the interior surface 46 substantially forms a continuation of the interior surface of the pipe 20. However, in some embodiments, the thickness $t_a$ can be different than the thickness $t_p$.

Between the first end 40 and the second end 42, the exterior surface 44 of the adaptor 30 is provided with at least one flange 50 that extends radially outwardly from the exterior surface 44. The flange 50 is configured to engage with the pull head 32 to transfer a pulling force acting on the pull head 32 to the adaptor 30 and to the pipe 20. More than one flange 50 can be used as described further below with respect to FIG. 10. The flange 50 can have any configuration that is suitable for achieving this function. In one embodiment, the flange 50 is circumferentially continuous around the entire circumference of the adaptor 30 although other configurations are possible. The flange 50 can be located anywhere along the length of the adaptor 30 but in the illustrated example, the flange 50 is located closer to the second end 42 than it is to the first end 40.

Referring to FIG. 3, a step 51 is formed to the rear of the flange 50, for example integrally extending from the flange 50 and located between the flange 50 and the first end 40. The step 51 helps to reduce loading applied to the flange 50 by the pull head 32 so that the flange 50 does not take all of the load.

Still referring to FIG. 3, the interior surface 46 defines a portion extending from the first end 40 toward the second end 42 that has a substantially constant diameter $D_1$. The constant diameter portion extends up to approximately a location of a front edge 52 of the flange 50, where the interior surface 46 increases in diameter to form a portion having a substantially constant diameter $D_2$ that is larger than the diameter $D_1$. The transition between the two diameters $D_1$ and $D_2$ forms a shoulder 54. Due to the increase in diameter, the thickness of the adaptor 30 at the second end 42 is less than the thickness $t_a$ at the first end 40. In some embodiment, an end of a mechanism 53 for connecting the pipeline component 34 (see FIG. 5) can abut against the shoulder 54 when the pipeline component 34 is connected to the adaptor 30. In other embodiments, the mechanism 53 does not abut against the shoulder 54 as shown in FIG. 5, in which case the shoulder 54 can be eliminated and the interior surface 46 can have a substantially constant diameter $D_1$ from end to end.

Figure 10:
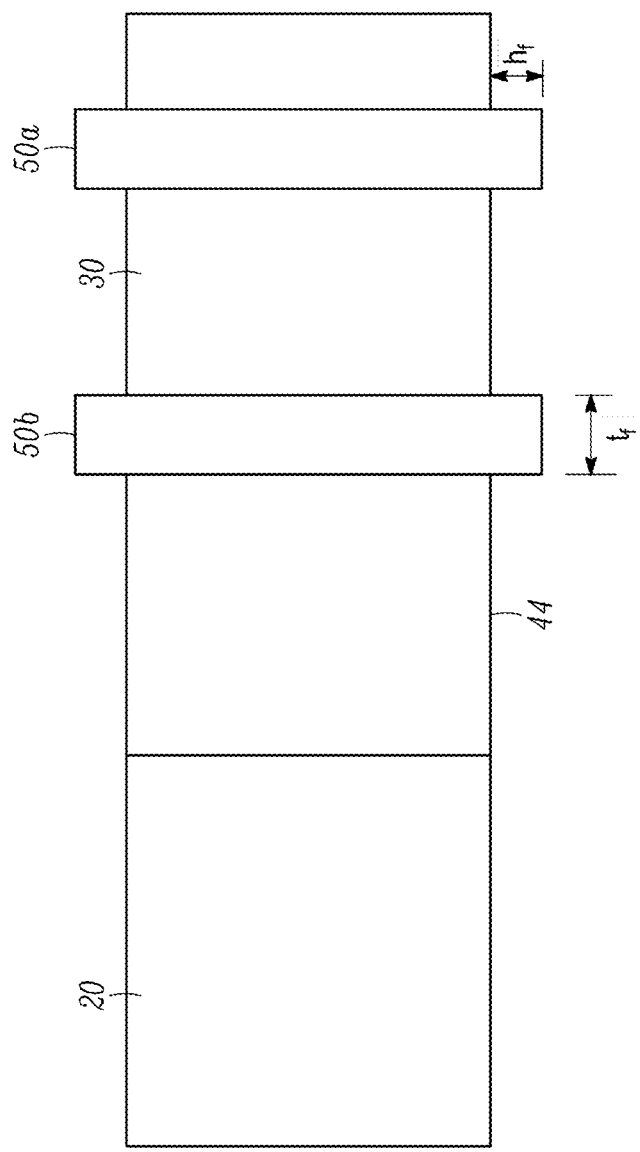
FIG. 10 is a side view of another embodiment of an adaptor attached to the end of the pipe.

FIG. 10 illustrates another embodiment of the adaptor 30 that is attached to the end of the pipe 20. In this embodiment, the adaptor 30 includes two or more flanges 50a, 50b that are spaced apart from one another. Each flange 50a, 50b can be received within a corresponding channel, similar to the channel 70 discussed further below, formed by the pull head 32. In the illustrated example, the flanges 50a, 50b can have the same or similar thickness $t_f$ and the same of similar height $h_f$ from the exterior surface 44 of the adaptor 30. A larger number of flanges can be utilized and the flanges can be spaced apart from one another or the flanges can abut one another. In addition, the flanges 50a, 50b can have different thicknesses $t_f$ and heights $h_f$. As discussed further below, the pull head 32 would be modified accordingly to engage with the flanges 50a, 50b. Any number and sizes of the flanges 50a, 50b can be used on the adaptor 30 to give added strength to pull against while pulling the pipe underground.

FIGS. 3 and 10 illustrate the flange(s) 50, 50a, 50b as being rectangular in side view. However, the flanges 50, 50a, 50b can have other shapes including, but not limited to, round, triangular, etc. when viewed in side view. In addition, although the flanges 50a, 50b are illustrated as being of the same size, the flanges 50a, 50b can have different sizes.

Figure 11:
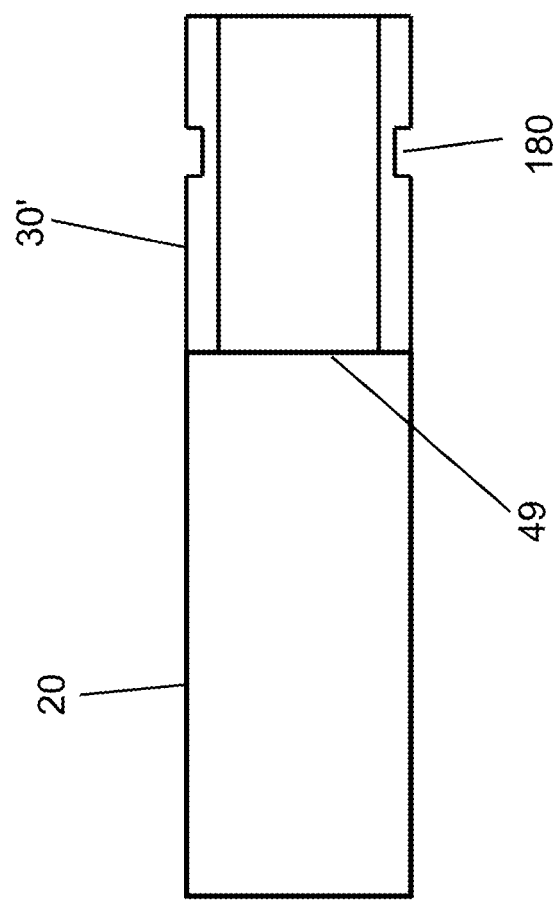
FIG. 11 is a cross-sectional side view of another embodiment of an adaptor attached to the end of the pipe.

In addition, referring to FIG. 11, the use of one or more flanges on the adaptor is not required. Instead, FIG. 11 illustrates an adaptor 30' that includes one or more channels 180 formed in the outer surface thereof. In one embodiment, the channel(s) 180 is circumferentially continuous about the periphery of the adaptor 30'. However, the channel(s) 180 need not be circumferentially continuous but can be interrupted by one or more non-recessed portions. In some embodiments, if required to accommodate pulling forces and forces during use, the thickness of the end of the adaptor 30' may be increased to better accommodate the channel(s) 180. If a channel(s) 180 is used, the pull heads described below will be modified to include corresponding one or more radially inwardly extending flanges that extend into the channel(s) 180 to secure the pull head 32 to the adaptor 30' and transfer the pulling forces to the adaptor 30'.

Figure 4:
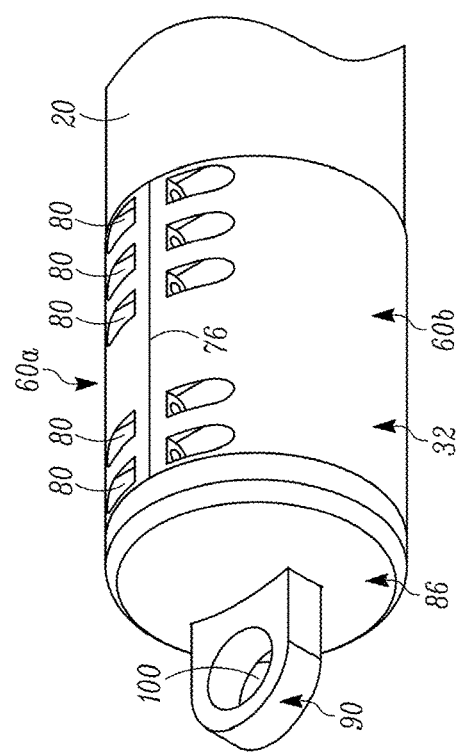
FIG. 4 is a perspective view of the pull head mounted in place.

Referring now to FIGS. 2-4, an example of the pull head 32 will now be described. The pull head 32 is configured to detachably connect to the adaptor 30 to apply pulling forces to the adaptor 30 and the pipe 20 to pull the adaptor 30 and the pipe 20 underground to the exit side 18. The pull head 32 can have any configuration that is suitable for achieving this function.

In the embodiment illustrated in FIGS. 2-4, the pull head 32 includes a plurality of pieces that are connectable together. The pull head 32 can have any number of pieces that are connectable together in order to perform the intended functions of the pull head 32. In one embodiment, the pull head 32 includes a pull head collar 58 that is removably disposable around the adaptor 30, and a pull head cap 86 that connects to the pull head collar 58. However, other configurations are possible.

In the example illustrated in FIGS. 2-4, the pull head collar 58 includes a plurality of, for example first and second, shell pieces 60a, 60b that are detachably connectable to one another so as to surround the adaptor 30 when the shell pieces 60a, 60b are connected together. When there are two of the shell pieces 60a, 60b, each of the shell pieces 60a, 60b can be configured as a half shell surrounding about half of the adaptor 30. However, in the case of two shell pieces, the shell pieces 60a, 60b can be configured to cover more or less than half of the adaptor 30. For example, the shell pieces 60a, 60b can be sized at ratios of 75/25, 60/40, etc.

For sake of convenience in describing the concepts, the description will hereinafter refer to first and second shell pieces 60a, 60b although a different number of shell pieces can be used, and the shell pieces 60a, 60b sized at a 50/50 ratio, i.e. the shell pieces 60a, 60b are half shells. However, other configurations are possible. The first and second shell pieces 60a, 60b are substantially identical in construction to one another. Each shell piece 60a, 60b forms a half cylinder with an exterior surface 62, an interior surface 64, a first end 66, and a second end 68. In the illustrated example, when the pull head collar 58 is mounted in place, the first ends 66 terminate at approximately the joint 49 so that the shell pieces 60a, 60b only overlap the adaptor 30 and do not overlap, or only minimally overlap, the pipe 20. However, the shell pieces 60a, 60b can be sized such that the first ends 66 extend past the joint 49 so that the shell pieces 60a, 60b overlap the adaptor 30 as well as a portion of the pipe 20.

Referring to FIGS. 2 and 3, a channel 70 is formed on the interior surface 64 of each of the shell pieces 60a, 60b so that when the shell pieces 60a, 60b are connected together around the adaptor 30, the channels 70 of the shell pieces 60a, 60b align with one another to form a substantially continuous circumferential channel that in use receives the flange 50 of the adaptor 30. In addition to the channel 70, the shell pieces 60a, 60b each include a smaller channel 71 so that when the shell pieces 60a, 60b are connected together around the adaptor 30, the channels 71 of the shell pieces 60a, 60b align with one another to form a substantially continuous circumferential channel that in use receives the step 51 of the adaptor 30

Referring to FIGS. 2 and 4, side edges 72, 74 of each shell piece 60a, 60b form mating surfaces that abut against and mate with one another to form a joint 76. Fastener holes 78 are formed along the lengths of the side edges 72, 74 that allow passage of fasteners 80, such as bolts, that removably secure the shell pieces 60a, 60b to one another surrounding the adaptor 30.

The interior surface 64 of each shell piece 60a, 60b is also formed with a friction enhancement section 82, best seen in FIGS. 2 and 3, that is configured to enhance frictional engagement between the pull head 32 and the exterior surface 44 of the adaptor 30. The friction enhancement section 82 can have any configuration that is suitable for achieving this function. In the illustrated example, the friction enhancement section 82 can be formed by teeth, knurling, rubber pads, or other friction enhancement features that engage with the exterior surface 44 of the adaptor 40. The exterior surface 44 opposite the friction enhancement section 82 can be substantially smooth or the exterior surface 44 can be provided with friction enhancement features that engage with the friction enhancement features of the friction enhancement section 82. The friction enhancement features can be integrally formed with the interior surface 64 of each shell piece 60a, 60b, or the friction enhancement features can be formed by a separate layer of material that is fixed to the interior surface 64 or simply disposed between the interior surface 64 and the exterior surface 44. In addition, in the illustrated example, the friction enhancement section 82 extends from one side edge 72 to the other side edge 74, is spaced inwardly from and does not extend all the way to the first end 66, and extends toward but stops short of the channel 70. However, other sizes and arrangements of the friction enhancement section 82 are possible.

Returning to FIGS. 2 and 3, each of the shell pieces 60a, 60b further includes an inwardly projecting flange 84 adjacent to the end 68 thereof. When the shell pieces 60a, 60b are connected together, the flanges 84 align with one another to form a substantially continuous circumferential flange the purpose of which is discussed further below.

The pull head cap 86 of the pull head 32 is disposed at the front end of the pull head 32 and is connected to the end 68 of the shell pieces 60*a*, 60*b* when the shell pieces 60*a*, 60*b* are connected together around the adaptor 30. When the shell pieces 60*a*, 60*b* are disconnected, the pull head cap 86 can be disconnected from the shell pieces 60*a*, 60*b*. In another embodiment, the pull head cap 86 can be integrally or permanently attached to one or more of the shell pieces 60*a*, 60*b*. In use, the pull head cap 86 connects to a pull line, such as a cable or rope or pipe, that applies a pulling force to the pull head 32. The pull head cap 86 can have any configuration that is suitable for achieving the functions of the pull head cap 86. In the illustrated example, the pull head cap 86 has a housing member 88, a pull eye 90, and a securement disk 92.

Referring to FIG. 3, the housing member 88 is a generally hollow, circular disk with a convex front surface 94 and a rearwardly extending flange 96. A slot 98 is formed in the front surface 94 through which a portion of the pull eye 90 extends forwardly. The pull eye 90 includes a hole 100 for connecting to the pull line. A disk 102 of the pull eye 90 is disposed within the housing member 88 and includes a curved surface 104 that engages with an interior curved surface of the front surface 94.

The securement disk 92 is configured to close the open end of the housing member 88. In particular, the securement disk 92 includes a disk 106 that closely fits within the flange 96 and the securement disk 92 and the housing member 88 are then fastened to one another by welding the disk 106 to the flange 96. To the rear of the disk 106 is a second disk 108 that has a diameter that is less than, greater than, or equal to the diameter of the disk 106. The disks 106, 108 define therebetween a circumferential channel 110 that in use receives the substantially continuous circumferential flanges 84 of the shell pieces 60*a*, 60*b* to secure the pull head cap 86 to the shell pieces 60*a*, 60*b*.

In some embodiments, it is desirable to prevent ingress of moisture, soil and other contaminants into the interior of the pipe 20 when pulling the pipe 20 underground. The joint 49 between the adaptor 30 and the pipe 20 is liquid tight and prevents ingress of moisture, soil and other contaminants. In addition, suitable sealing can be provided between the pull head 32 and the adaptor 30 to prevent ingress of moisture, soil and other contaminants. For example, in the illustrated example, a circumferential sealing groove 112 can be formed in the outer surface of the disk 108 that is designed to receive a sealing gasket therein which seals with the interior surface 64 of the shell pieces 60*a*, 60*b*. In addition, the interior surface 64 of each shell piece 60*a*, 60*b* can be formed with a sealing groove 114 which combine to form a circumferential sealing groove that is designed to receive a sealing gasket therein which seals with the exterior surface 44 of the adaptor 30. However, other sealing arrangements and configurations can be utilized including a seal between the rear surface of the disk 108 and the front facing surface of the adaptor 30.

Figure 6:
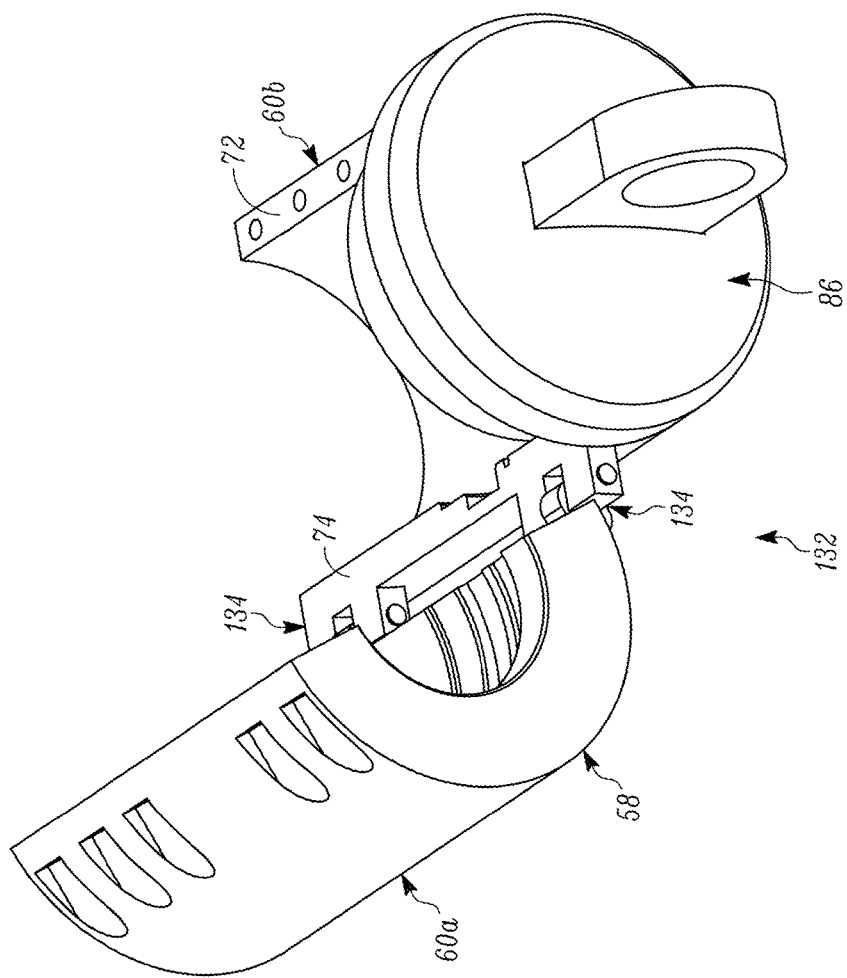
FIG. 6 illustrates another example of a pull head.

Referring to FIG. 6, another example of a pull head 132 is illustrated. The pull head 132 can be generally similar in construction to the pull head 32 in that the pull head 132 includes the pull head collar 58 formed by the shell pieces 60*a*, 60*b*, as well as including the pull head cap 86. However, in this embodiment, the shell pieces 60*a*, 60*b* are hinged to one another along one of the side edges 72, 74, for example the side edge 74 in this example. The shell pieces 60*a*, 60*b* are connected together by one or more hinges 134, for example two of the hinges 134, that permits the shell piece 60*a* to open or close relative to the shell piece 60*b* while the shell pieces 60*a*, 60*b* remain connected to one another. FIG. 6 shows the shell piece 60*a* at an open position relative to the shell piece 60*b*. The shell piece 60*a* can swing to a closed position relative to the shell piece 60*b* so as to fit around the adaptor 30 similar to what is shown in FIGS. 3 and 4. This embodiment eliminates the need for a second row of fasteners 80 along the side edges 74 of the shell pieces 60*a*, 60*b*. The construction of the shell pieces 60*a*, 60*b* of the pull head collar 58 and the pull head cap 86 are otherwise similar to the construction described in FIGS. 2-4.

Figure 7:
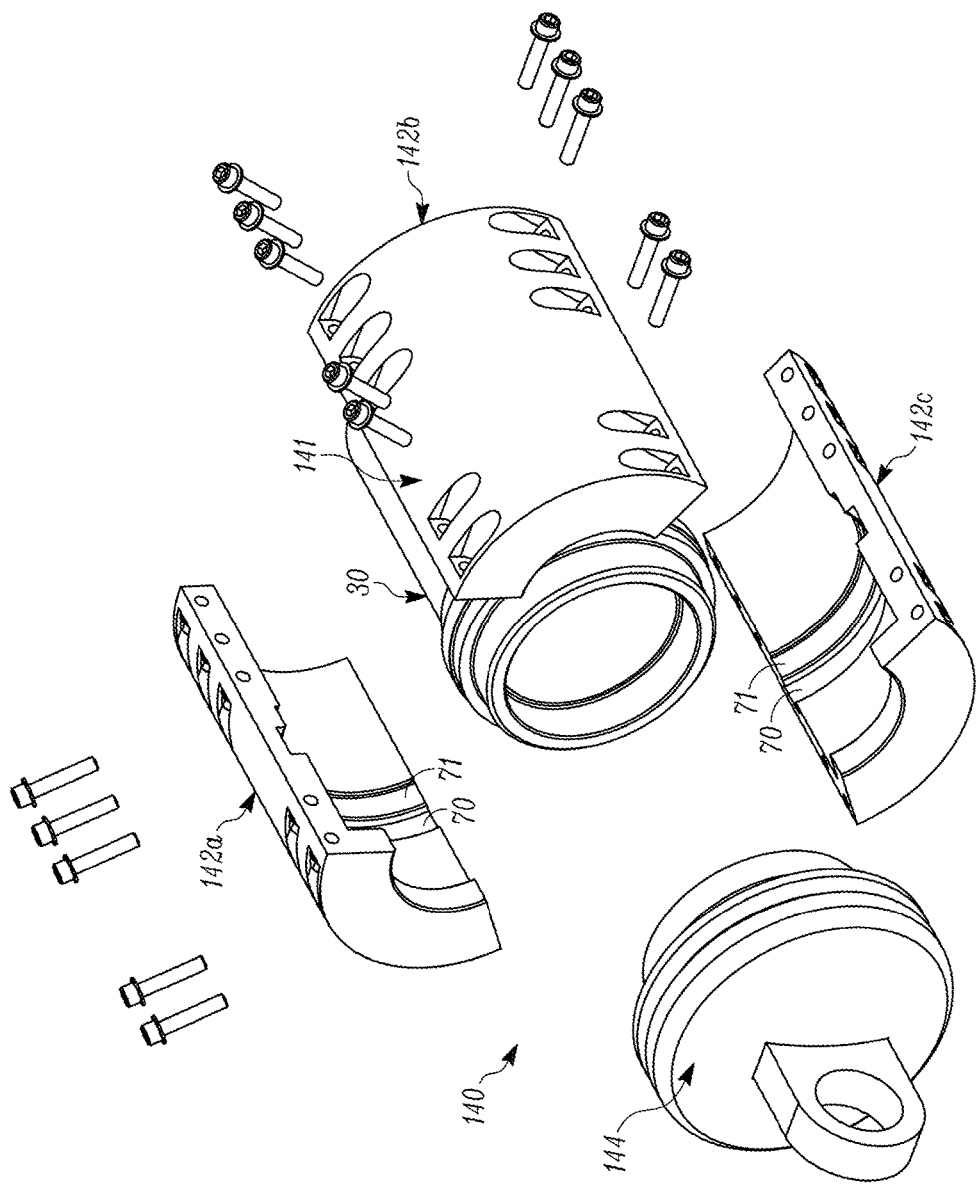
FIG. 7 illustrates another example of a pull head.

FIG. 7 illustrates another example of a pull head 140 that has a pull head collar 141 that is formed by three shell pieces 142*a*, 142*b*, 142*c*. In this example, each shell piece 142*a*, 142*b*, 142*c* covers approximately 120 degrees, and when the shell pieces 142*a*, 142*b*, 142*c* are connected together, they combine to encircle the adaptor 30. Each shell piece 142*a*, 142*b*, 142*c* is configured generally similarly to the shell pieces 60*a*, 60*b*, including each shell piece 142*a*, 142*b*, 142*c* having the channel 70 and the smaller channel 71 the purpose of which is the same as for the shell pieces 60*a*, 60*b*. In addition, the pull head 140 can include a pull head cap 144 that can be identical in construction to the pull head cap 86.

Figure 8:
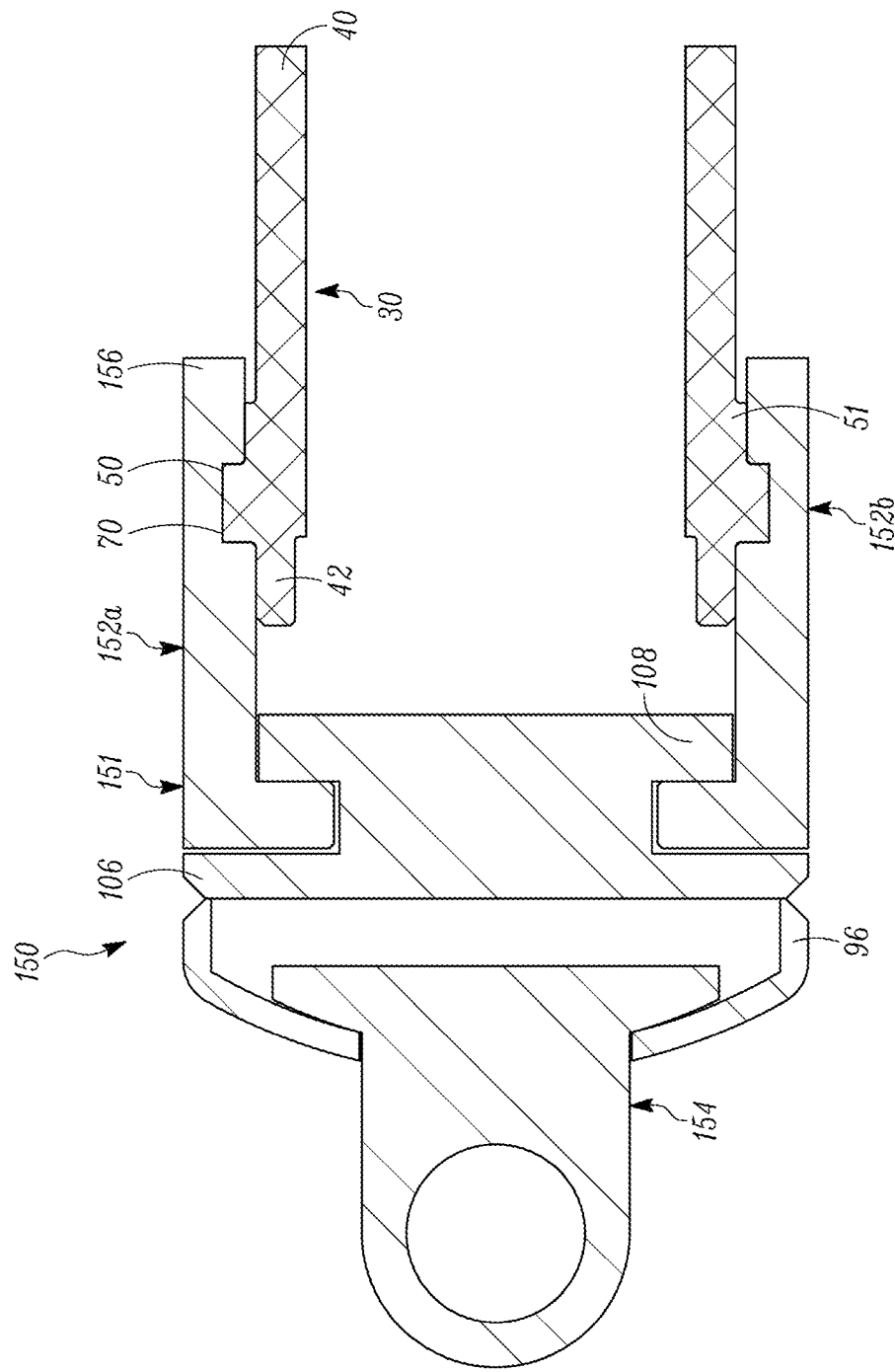
FIG. 8 illustrates still another example of a pull head.

FIG. 8 illustrates another example of a pull head 150 that includes a pull head collar 151 that is formed by at least two shell pieces 152*a*, 152*b*, and a pull head cap 154. For sake of convenience, the pipe 20 is not illustrated in FIG. 8. In this example, the shell pieces 152*a*, 152*b* have a length that is shorter than the length of the shell pieces 60*a*, 60*b* so that an end 156 of each shell piece 152*a*, 152*b* stops well short or forward of the first ends 40 of the adaptor 30. In addition, in this example, the shell pieces 152*a*, 154 include the channel 70 to receive the flange 50 but do not include the smaller channel 71 for the step 51 on the adaptor 30. The second end 42 of the adaptor 30 is also spaced from the disk 108 of the pull head cap 154.

With continued reference to FIG. 8, the pull head cap 154 is generally similar in construction to the pull head cap 86. However, the disk 106 does not fit within the flange 96. Instead, the end of the flange 96 abuts against the face of the disk 106 and the end of the flange 96 is then welded to the face of the disk 106.

Figure 9:
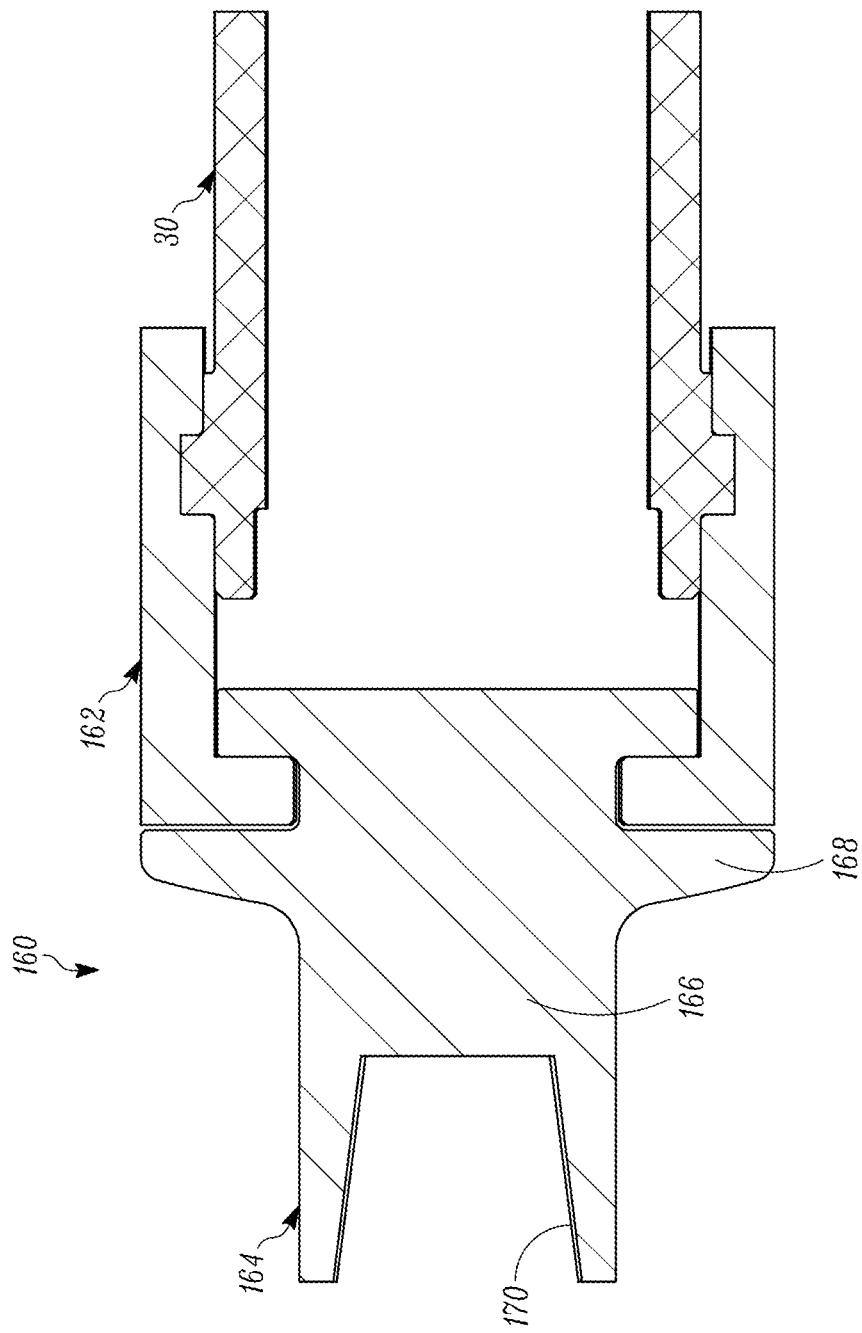
FIG. 9 illustrates still another example of a pull head.

FIG. 9 illustrates another example of a pull head 160 that includes a pull head collar 162 and a pull head cap 164. For sake of convenience, the pipe 20 is not illustrated in FIG. 9. The pull head collar 162 can be formed by two or more shell pieces that are constructed as discussed above for FIGS. 2-4 and 6-8. In this embodiment, the pull head cap 164 is a single piece construction. In addition, instead of having a pull eye 90, the pull head cap 164 includes a central boss 166 that extends from a disk 168. The central boss 166 includes a threaded aperture 170. In use, a threaded connector (not shown) of a pull line will thread into the aperture 170 to secure the pull line to the pull head 160 while pulling the pipe underground.

Figure 12:
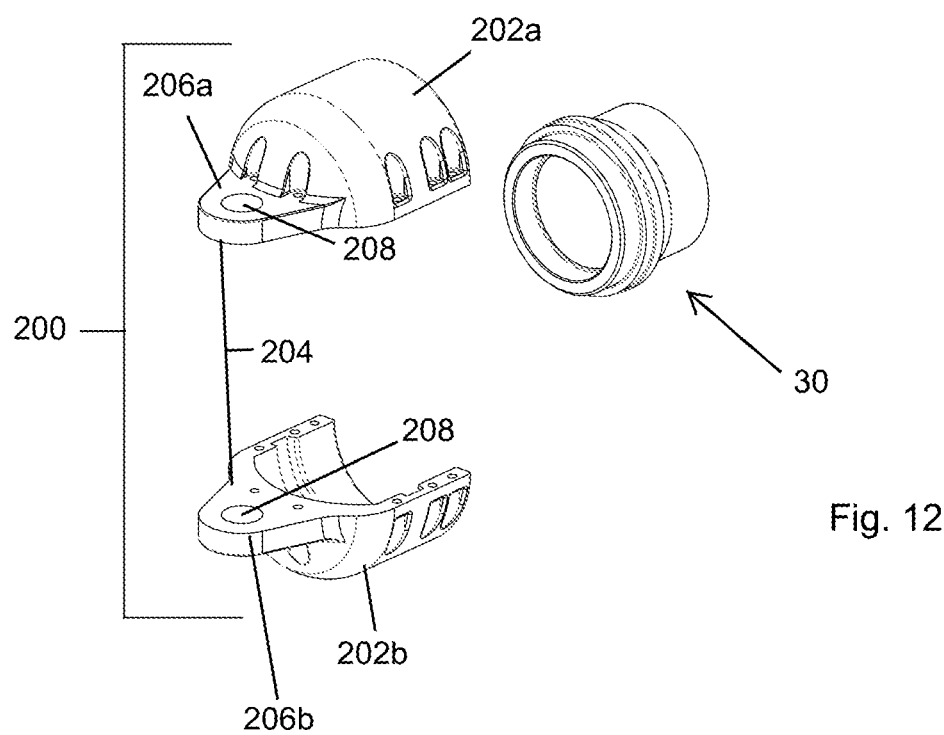
FIG. 12 is an exploded view of another embodiment of a pull head.
Figure 13:
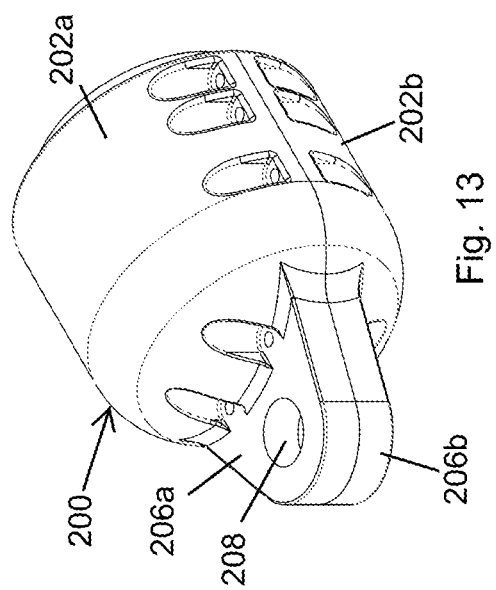
FIG. 13 shows the pull head of FIG. 12 assembled.

FIGS. 12 and 13 illustrate an embodiment of a pull head 200 that is formed by multiple shell pieces 202*a*, 202*b* that are connectable together around the adaptor using the fasteners 80 (not shown in FIGS. 12 and 13). The interior construction of the shell pieces 202*a*, 202*b* can be substantially similar to the interior construction of the shell pieces of the pull heads 32, 132, 142, etc. described above. In this embodiment, the pull head 200 includes a pull head cap 204 that is formed by pull head cap pieces 206*a*, 206*b* that are integrally formed with the respective shell pieces 202*a*, 202*b* so that the shell piece 202*a* and the pull head cap piece 206*a* together form a single, unitary construction, and the shell piece 202*b* and the pull head cap piece 206*b* together form a single, unitary construction. Each pull head cap piece 206*a*, 206*b* includes an opening 208 formed therethrough, where the openings 208 align with one another when the shell pieces 202*a*, 202*b* are secured around the adaptor to form a pull eye. Optionally, one or more fastener openings 210 can be provided on the pull head cap pieces 206*a*, 206*b* that receive fasteners, such as bolts or screws, help fasten the pull head cap pieces 206*a*, 206*b* to one another when the shell pieces 202*a*, 202*b* are secured around the adaptor.

An example operation and use will now be described with reference to the embodiment illustrated in FIGS. 2-4. The embodiments in FIGS. 6-9 operate in a similar manner. This example will assume that the pipe 20 and the adaptor 30 are plastic and that the pipe 20 and adaptor 30 are fused to one another. However, a similar operation can be performed when the adaptor 30 is welded to the end of the pipe. Referring to FIG. 1, the pipe 20 needs to be pulled underground from the first side 16 to the second side 18 underneath the obstacle 10. At the first side 16, the end 40 of the adaptor 30 is fused to the end 48 of the pipe 20, for example while the end 48 of the pipe 20 is disposed above ground. Therefore, the workers and equipment that are performing the fusing are working above ground instead of within a deep trench as with the prior art. Thereafter, the pull head 32 is secured around the adaptor 30 as shown in FIGS. 3 and 4. The pulling force is then applied to the pull head 32 from the second side 18. The pulling force pulls the pipe 20 into and through the hole 14 until the pull head 32 emerges from the second side 18. The pull head 32 is then removed from around the adaptor 30 which remains in place fused with the pipe 20. Thereafter, the pipeline component 34 is installed to continue the pipeline as shown in FIG. 5. In this example, installing the pipeline component 34 occurs without having to cut-off any part of the pipe 20 or the adaptor 30 at the second side 18, or fusing an adaptor to the pipe 20 at the second side 18 within a deep trench. So once the adaptor 30 is fused to the pipe 20 at the first side 16 and the pipe is pulled underground to the second side 18, the pull head 32 can be removed and connection to the pipeline component 34 can occur without having to cut the pipe 20 or the adaptor 30 or fuse an adaptor to the pipe at the second side 18.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A system operable to pull a pipe underground from a first location to a second location, comprising:
 a pull head, including:
  two shell pieces that are hinged to one another by two hinges that are spaced from one another, the two shell pieces are moveable between an open position and a closed position, the two shell pieces are cooperable with each other to surround an adaptor coupled to the pipe in the closed position of the two shell pieces, the two shell pieces include an interior surface that is configured to permit the two shell pieces to engage with a flange on the adaptor when the two shell pieces are in the closed position and when a pulling force is applied to the pull head; and
  a pull eye that is connected to the two shell pieces, the pull eye is connectable to a pull line that applies a pulling force to the pull head,
 wherein each of the two shell pieces defines a pull eye portion that defines a portion of the pull eye, each pull eye portion includes an opening formed therethrough; wherein when the two shell pieces are in the closed position, the openings in the pull eye portions align with one another.

2. The system of claim 1, wherein the adaptor comprises a substantially cylindrical and tubular adaptor having a first end, a second end, an interior surface defining a flow passageway between the first end and the second end, an exterior surface, and a flange extending radially outwardly from the exterior surface, the flange is located between the first end and the second end, the flange is spaced from the first end and the flange is spaced from the second end, wherein the pull head that is removably attachable to the adaptor.

3. The system of claim 2, wherein the flange is circumferentially continuous, and the interior surface of the shell pieces defines a circumferentially continuous channel that is engageable with the flange.

4. The system of claim 2, wherein the flange is positioned closer to the second end than to the first end.

5. The system of claim 2, wherein the pull eye is integrally formed with the two shell pieces, each of the two shell pieces defines a pull eye portion that defines a portion of the pull eye, each pull eye portion includes an opening formed therethrough; wherein when the two shell pieces are in the closed position, the openings in the pull eye portions align with one another.

6. The system of claim 2, wherein the two shell pieces have a length whereby ends of the two shell pieces do not project beyond the first end of the adaptor when the two shell pieces are in the closed position surrounding the adaptor.

7. The system of claim 6, wherein the adaptor has a first portion extending from the first end toward the flange, and the first portion has a substantially constant inner and outer diameter.

8. The system of claim 7, wherein the inner diameter and the outer diameter of the first portion of the adaptor are substantially the same as that of the pipe.

9. The system of claim 1, wherein the adapter is configured to couple the pipe to a pipeline component.

10. A system operable to pull a pipe underground from a first location to a second location, comprising:
 a pull head, including:
  a first shell piece and a second shell piece, the first and second shell pieces are hinged to one another by two hinges that are spaced from one another, the first and second shell pieces are pivotable relative to one another between an open position and a closed position at which the first and second shell pieces surround an adaptor coupled to the pipe, wherein the adaptor comprises a substantially cylindrical and tubular adaptor having a first end, a second end, an interior surface defining a flow passageway between the first end and the second end, an exterior surface, and a flange extending radially outwardly from the exterior surface, the flange is located between the first end and the second end, the flange is spaced from the first end and the flange is spaced from the second end, wherein the pull head is removably attachable to the adaptor;
  the first and second shell pieces include an interior surface that defines a channel when the first and second shell pieces are at the closed position, the channel is positioned on the interior surface and is configured to receive a flange on the adaptor when the first and second shell pieces are in the closed position; and a pull eye connected to the first and second shell pieces, the pull eye is connectable to a pull line that applies a pulling force to the pull head.

11. The system of claim 10, wherein the flange is circumferentially continuous, and the channel is circumferentially continuous.

12. The system of claim 10, wherein the flange is positioned closer to the second end than to the first end.

13. The system of claim 10, wherein the pull eye is integrally formed with the first and second shell pieces, each of the two shell pieces defines a pull eye portion that defines a portion of the pull eye, each pull eye portion includes an opening formed therethrough; wherein when the two shell pieces are in the closed position, the openings in the pull eye portions align with one another.

14. The system of claim 10, wherein the two shell pieces have a length whereby ends of the two shell pieces do not project beyond the first end of the adaptor when the two shell pieces are in the closed position surrounding the adaptor.

15. The system of claim 14, wherein the adaptor has a first portion extending from the first end toward the flange, and the first portion has a substantially constant inner and outer diameter.

16. The system of claim 15, wherein the inner diameter and the outer diameter of the first portion of the adaptor are substantially the same as that of the pipe.

17. The system of claim 10, wherein the adapter is configured to couple the pipe to a pipeline component.

18. A pull head operable to pull a pipe underground from a first side to a second side, the pull head comprising:

first and second shell pieces that are connected to one another by two hinges that are spaced from one another, the first and second shell pieces are moveable between an open position at which the first and second shell pieces remain connected to one another and a closed position to surround an adaptor coupled to the pipe;

the first and second shell pieces include an interior surface that define a channel when the first shell piece and the second shell piece are in the closed position, the channel is positioned on the interior surface and is configured to receive a flange on the adaptor when the first shell piece and the second shell pieces are in the closed position;

each of the first shell piece and the second shell piece includes a pull head cap piece that is integrally formed therewith that together define a pull eye when in the closed position that is connectable to a pull line that applies a pulling force to the pull head, each of the pull head cap pieces includes an opening formed therethrough, where the openings in the pull head cap pieces align with one another when the first shell piece and the second shell piece are in the closed position;

the pull head cap pieces project from an end of the first shell piece and an end of the second shell piece, respectively, in a direction away from the channel;

the first and second shell pieces have a length whereby ends of the first and second shell pieces opposite the pull head cap pieces do not overlap the pipe when the first and second shell pieces are in the closed position surrounding the adaptor.

* * * * *